United States Patent
Mahmud et al.

(12)

(10) Patent No.: US 6,197,274 B1
(45) Date of Patent: Mar. 6, 2001

(54) SILICA COATED CARBON BLACKS

(75) Inventors: Khaled Mahmud, Natick; Meng-Jiao Wang, Lexington; James A. Belmont, Acton; Steven R. Reznek, Concord, all of MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/937,154

(22) Filed: Sep. 25, 1997

Related U.S. Application Data

(60) Provisional application No. 60/026,689, filed on Sep. 25, 1996.

(51) Int. Cl.$^7$ ................................................. C01D 3/00
(52) U.S. Cl. ..................................... 423/449.2; 423/449.9
(58) Field of Search ............................... 423/449.2, 449.9

(56) References Cited

U.S. PATENT DOCUMENTS

| | | |
|---|---|---|
| T860,001 | 3/1969 | Gessler . |
| 1,999,573 | 4/1935 | Odell ....................... 134/60 |
| 2,121,535 | 6/1938 | Amon ....................... 106/475 |
| 2,375,795 | 5/1945 | Krejci ....................... 23/209.8 |
| 2,439,442 | 4/1948 | Amon et al. ................ 23/209.4 |
| 2,564,700 | 8/1951 | Krejci ....................... 23/209.4 |
| 2,632,713 | 3/1953 | Krejci ....................... 106/307 |
| 2,793,100 | 5/1957 | Weihe ....................... 423/460 |
| 2,867,540 | 1/1959 | Harris ....................... 106/476 |
| 3,011,902 | 12/1961 | Jordon ...................... 106/30 R |
| 3,025,259 | 3/1962 | Watson et al. .............. 106/476 |
| 3,094,428 | 6/1963 | Hamilton et al. ............ 106/307 |
| 3,188,225 | 6/1965 | Walker ....................... 106/291 |
| 3,203,819 | 8/1965 | Steenken et al. ............ 106/307 |
| 3,290,165 | 12/1966 | Iannicelli .................. 106/308 |
| 3,317,458 | 5/1967 | Clas et al. ................. 260/41.5 |
| 3,335,020 | 8/1967 | Aboytes et al. ............. 106/476 |
| 3,390,006 | 6/1968 | Takewell et al. ............ 475/20 R |
| 3,423,391 | 1/1969 | Kindler et al. ............. 106/20 R |
| 3,528,840 | 9/1970 | Aboytes ..................... 106/473 |
| 3,622,650 | 11/1971 | Berstein et al. ............ 260/763 |
| 3,660,132 | 5/1972 | Illigen et al. .............. 106/307 |
| 3,663,285 | 5/1972 | Graf et al. ................. 106/308 |
| 3,671,476 | 6/1972 | Terai et al. ................. 260/23 |
| 3,686,111 | 8/1972 | Makhloaf et al. ............ 524/530 |
| 3,689,452 | 9/1972 | Burke, Jr. .................. 260/33.6 |
| 3,716,513 | 2/1973 | Burke, Jr. .................. 260/33.6 |
| 3,997,356 | 12/1976 | Thurn et al. ................ 106/288 |
| 4,006,031 | 2/1977 | Ferch et al. ................ 106/473 |
| 4,014,844 | 3/1977 | Vidal et al. ................ 106/472 |
| 4,108,679 | 8/1978 | Szczepanik et al. .......... 106/307 |
| 4,211,578 | 7/1980 | Scott, IV ................... 106/475 |
| 4,221,693 | 9/1980 | Getson et al. ................ 260/37 |
| 4,265,768 | 5/1981 | Beasley et al. .............. 210/682 |
| 4,297,145 | 10/1981 | Wolff et al. ................ 106/308 |
| 4,320,011 | 3/1982 | Sato et al. .................. 210/694 |
| 4,366,139 | 12/1982 | Kühner et al. ............... 423/449 |
| 4,452,638 | 6/1984 | Gallus ........................ 106/97 |
| 4,530,961 | 7/1985 | Nguyen et al. ............... 106/20 R |
| 4,537,633 | 8/1985 | Hong ......................... 106/96 |
| 4,590,052 | 5/1986 | Chevallier et al. ........... 423/335 |

(List continued on next page.)

FOREIGN PATENT DOCUMENTS

| | | |
|---|---|---|
| 1 948 443 | 4/1971 | (DE) . |
| 2 355 758 | 5/1975 | (DE) . |
| 3 502 494 | 8/1985 | (DE) . |
| 3 813 678 A1 | 11/1988 | (DE) . |
| 195 20 946 A1 | 12/1996 | (DE) . |
| 0 006 190 A1 | 1/1980 | (EP) . |
| 0 468 140 A2 | 1/1992 | (EP) . |
| 0 475 075 A1 | 3/1992 | (EP) . |
| 0 050 354 | 4/1992 | (EP) . |
| 675 175 | 10/1995 | (EP) . |
| 0 711 805 A1 | 5/1996 | (EP) . |
| 0 799 854 A1 | 10/1997 | (EP) . |
| 0 799 867 A1 | 10/1997 | (EP) . |
| E 72775 | 4/1960 | (FR) . |
| 1230893 | 9/1960 | (FR) . |
| 1331889 | 5/1963 | (FR) . |
| 1 459 019 | 1/1967 | (FR) . |
| 1 499 348 | 1/1968 | (FR) . |
| 0 862 018 | 3/1961 | (GB) . |
| 1139620 | 1/1969 | (GB) ..................... 106/475 |
| 1191872 | 5/1970 | (GB) . |
| 1213186 | 11/1970 | (GB) . |
| 1363428 | 8/1974 | (GB) . |
| 1363429 | 8/1974 | (GB) . |
| 2044741 | 10/1980 | (GB) . |

(List continued on next page.)

OTHER PUBLICATIONS

Derwent Abstract, AN No. 80–03330C, "Sulphonated Carbon Pigment Production by Treating Technical Grade Carbon with Hot Aqueous Acid," SU,A,659, 523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN No. 88–116672 "Surface Treatment of Carbon Black Powder Coating . . . ," Mar. 22, 1988, JPA 86 0208468.

Derwent Abstract, AN No. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

(List continued on next page.)

*Primary Examiner*—Edward J. Cain

(57) ABSTRACT

Silica coated carbon blacks are disclosed and can be prepared by coating a fine dispersion of carbon black, such as a carbon black having an attached organic group(s). Compositions and articles of manufacture, including elastomeric compositions, containing such carbon black are also disclosed.

28 Claims, No Drawings

U.S. PATENT DOCUMENTS

| | | | |
|---|---|---|---|
| 4,597,794 | 7/1986 | Ohta et al. | 106/20 C |
| 4,670,059 | 6/1987 | Hackleman et al. | 106/475 |
| 4,751,204 | 6/1988 | Kyoden et al. | 501/89 |
| 4,820,751 | 4/1989 | Takeshita et al. | 523/215 |
| 4,831,011 | 5/1989 | Oikawa et al. | 502/406 |
| 4,929,391 | 5/1990 | Kroupa | 252/511 |
| 5,130,363 | 7/1992 | Scholl et al. | 524/392 |
| 5,149,732 | 9/1992 | Igarashi et al. | 524/426 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,227,425 | 7/1993 | Rauline | 524/493 |
| 5,281,261 | 1/1994 | Lin | 106/20 R |
| 5,282,887 | 2/1994 | Gay et al. | 106/261 |
| 5,286,291 | 2/1994 | Bernhardt et al. | 106/475 |
| 5,294,253 | 3/1994 | Carlson et al. | 106/475 |
| 5,328,949 | 7/1994 | Sandstrom et al. | 524/262 |
| 5,336,730 | 8/1994 | Sandstrom et al. | 524/492 |
| 5,401,313 | 3/1995 | Supplee et al. | 106/475 |
| 5,401,789 | 3/1995 | Wolff et al. | 523/213 |
| 5,430,087 | 7/1995 | Carlson et al. | 106/475 |
| 5,502,146 | 3/1996 | Inoue et al. | 528/34 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,580,919 | 12/1996 | Agostini et al. | 524/430 |
| 5,622,557 | 4/1997 | Mahmud et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,679,728 | 10/1997 | Kawazura | 523/216 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |

FOREIGN PATENT DOCUMENTS

| | | |
|---|---|---|
| 2 188 311 | 9/1987 | (GB) . |
| 2 296 915 | 7/1996 | (GB) . |
| 56-078629 | 6/1981 | (JP) . |
| 59-82467 | 5/1984 | (JP) . |
| 62-250073 | 10/1987 | (JP) . |
| 5-178604 | 7/1993 | (JP) . |
| 6067421 | 3/1994 | (JP) . |
| 8073657 | 3/1996 | (JP) . |
| WO 91/02034 | 8/1990 | (WO) . |
| WO 91/15425 | 1/1991 | (WO) . |
| WO 92/13983 | 8/1992 | (WO) . |
| WO 95/01838 | 1/1995 | (WO) . |
| WO 96/18688 | 6/1996 | (WO) . |
| WO 96/18689 | 6/1996 | (WO) . |
| WO 96/18694 | 6/1996 | (WO) . |
| WO 96/18695 | 6/1996 | (WO) . |
| WO 96/18696 | 6/1996 | (WO) . |
| WO 96/37546 | 11/1996 | (WO) . |
| WO 96/37547 | 11/1996 | (WO) . |
| ISR 96/14583 | 2/1997 | (WO) . |
| WO 97/10291 | 3/1997 | (WO) . |
| ISR 97/08049 | 5/1997 | (WO) . |
| ISR 97/08854 | 11/1997 | (WO) . |
| ISR 97/17134 | 1/1998 | (WO) . |

OTHER PUBLICATIONS

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43, No. 4, pp. 289–298, 1964, no month.

Roberts et al., *Basic Principles of Organic Chemistry,* Secone Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon,* vol. 25, No. 6, pp. 809–819, 1987, no month available.

Delamar et al., J. Am. Chem. Soc. 1992, 114, 5883–5884, no month available.

Concise Encyclopedia of Polymer Science and Engineering, Wiley, 1990, pp. 104–105.

Carbon (Carbon Black) reprinted from Kirk–Othmer: Encyclopedia of Chemical Technology, vol. 4, Third Edition, pp. 631–643, 1978.

SILICA COATED CARBON BLACKS

This application claims the benefit of U.S. Provisional Application 60/026,689 filed Sep. 25, 1996, under 35 U.S.C. §119(e).

FIELD OF THE INVENTION

The present invention relates to novel silica coated carbon blacks and a method s for their preparation. More particularly, the invention relates to improved silica coated carbon blacks produced from a fine dispersion, and to compositions and articles incorporating such carbon blacks.

DESCRIPTION OF BACKGROUND

Carbon blacks are widely used as pigments, fillers and reinforcing agents in the compounding and preparation of rubber and other elastomeric compounds. Carbon blacks are particularly useful as reinforcing agents in the preparation of elastomeric compounds used in the manufacture of tires.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate.

Carbon blacks are generally characterized on the basis of analytical properties, including, but not limited to particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037-Method A) and cetyl-trimethyl ammonium bromide adsorption value (CTAB) (measured by ASTM test procedure D3765 [09.01]), are measures of specific surface area. Dibutylphthalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black-containing compounds when constructing the tread and other portions of the tire. For example, a suitable tread compound will employ an elastomer compounded to provide high abrasion resistance and good hysteresis balance at different temperatures. A tire having high abrasion resistance is desirable because abrasion resistance is proportional to tire life. The physical properties of the carbon black directly influence the abrasion resistance and hysteresis of the tread compound. Generally, a carbon black with a high surface area and small particle size will impart a high abrasion resistance and high hysteresis to the tread compound. Carbon black loading also affects the abrasion resistance of the elastomeric compounds. Abrasion resistance increases with increased loading, at least to an optimum point, beyond which abrasion resistance actually decreases.

The hysteresis of an elastomeric compound relates to the energy dissipated under cyclic deformation. In other words, the hysteresis of an elastomeric composition relates to the difference between the energy applied to deform the elastomeric composition and the energy released as the elastomeric composition recovers to its initial unreformed state. Hysteresis is characterized by a loss tangent, tan δ, which is a ratio of the loss modulus to the storage modulus (that is, viscous modulus to elastic modulus).

Tires made with a tire tread compound having a lower hysteresis measured at higher temperatures, such as 40° C. or higher, will have reduced rolling resistance, which in turn, results in reduced fuel consumption by the vehicle using the tire. At the same time, a tire tread with a higher hysteresis value measured at low temperature, such as 0° C. or lower, will result in a tire with high wet traction and skid resistance which will increase driving safety. Thus, a tire tread compound demonstrating low hysteresis at high temperatures and high hysteresis at low temperatures can be said to have a good hysteresis balance.

There are many other applications where it is useful to provide an elastomer exhibiting a good hysteresis balance, but where abrasion resistance is not an important factor. Such applications include, but are not limited to, tire components such as undertread, wedge compounds, sidewall, carcass, apex, bead filler and wire skim; engine mounts; and base compounds used in industrial drive and automotive belts.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction accounts for the poor performance of silica used alone. The silica-elastomer interaction can be improved by chemically bonding the two with a chemical coupling agent, such as bis (3-triethoxysilylpropyl) tetra-sulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density, and poor processability.

When carbon black alone is used as a reinforcing agent in elastomeric compositions it does not chemically couple to the elastomer, but the carbon black surface provides many sites for interacting with the elastomer. While the use of a coupling agent is with carbon black might provide some improvement in performance to an elastomeric composition, the improvement is not comparable to that obtained when using a coupling agent with silica.

It is therefore desirable to combine the properties of silica and carbon black, particularly in elastomeric compositions. This can be accomplished by using silica coated carbon blacks. One process for making silica coated carbon blacks is as follows.

A carbon black slurry is prepared using a conventional method. An alkli silicate solution, for example, soda water glass (sodium silicate), is added to the slurry of carbon black. An acid, for example, sulfuric acid, is also added to the slurry. The pH of the slurry is maintained at greater than 7. The silica precipitates onto the carbon black surface. After a certain period of precipitation, the products are filtered and dried.

When using such conventional methods, however, the carbon black slurry does not form a good dispersion thus making the coating of the carbon black quite difficult.

SUMMARY OF THE INVENTION

The present invention is directed to a method of preparing silica coated carbon black, to the blacks so produced, and to compositions and articles incorporating the blacks, particularly elastomeric compositions. The invention is also directed to silica coated carbon black/elastomeric formulations using a variety of elastomers useful in a variety of product applications.

DETAILED DESCRIPTION OF THE INVENTION

The silica coated carbon blacks of the present invention may be obtained by coating a silicon oxide compound onto at least a portion of the carbon black aggregate, present in the form of a finely dispersed slurry. Any carbon black may be used.

A finely dispersed carbon black solution can be prepared using the methods described in U.S. patent application Ser. No. 08/356,653, entitled "Reaction of Carbon Materials with Diazonium Salts and Resultant Carbon Products," filed Dec. 15, 1994, and WO 96/18688, the disclosures of which are fully incorporated by reference herein. Suitable methods are also disclosed in U.S. patent application Ser. No. 08/356,660, entitled "Reaction of Carbon Black With Diazonium Salts, Resultant Carbon Black Products and Their Uses," filed Dec. 15, 1994, and its continuation-in-part application, Ser. No. 08/572,525, filed Dec. 14, 1995, and U.S. Pat. Nos. 5,554,739 and 5,630,868, the disclosures of which are fully incorporated by reference herein. The carbon black, from such a treatment, would have attached organic groups.

As an example, the finely dispersed carbon black slurry can be prepared by reacting the carbon black with the diazonium salt of sulfanilic acid. The diazonium salt of sulfanilic acid can be generated in an aqueous slurry in the presence of carbon black by the combination of nitric acid and sodium nitrite.

Alternatively, a slurry may be made in an agitated tank using carbon black and water. The slurry is then pumped into a homogenizer which finely disperses the carbon black. Carbon black prepared in this fashion typically has at least 90% of agglomerates less than 10 microns in size. One homogenizer, a microfluidizer system, is commercially available from Microfluidics International Corporation, Newton, Mass.

Once the carbon black having an attached organic group is prepared, the carbon black having an attached organic group is fully or partially coated with a silicon oxide compound by a number of different methods. One such method is taught in Japanese (Kokai) patent application No. HEI 5(1993)-178604. To prepare the silica coated carbon black, an organo-silicate such as tetraethylorthosilicate, or a silane such as tetraethoxysilane, may be diluted with a solvent such as methanol to produce a silicon compound solution having a concentration of between about 1 and 20% by weight of the s silicon compound. Another solution is made by adding 5–20% of a 28% aqueous ammonia solution to ethanol.

A carbon black having an attached organic group is then slowly added to the ammonia solution, while continuously stirring the mixture. The organo-silicon compound solution is added dropwise to the ammonia solution resulting in the silica precipatating out. After up to several hours of this operation, the silica coated carbon black is extracted, filtered and dried.

Alternatively, the silica coating can be accomplished as shown in Japanese (Kokai) patent application No. HEI 7(1995)-30269 which involves bringing into contact carbon black with an acid solution and an inorganic silicon compound solution. Preferably, the acid solution is a sulfuric acid solution and the inorganic silicon compound solution is a sodium silicate solution which is preferably diluted to an equivalent of 5% $SiO_2$. Also, the carbon black is preferably brought into contact with the acid solution as a carbon black aqueous slurry to form a mixture. This mixture is maintained at a pH of from about 10 to about 10.5 and can be adjusted using a base such as sodium hydroxide and/or an acid, such as sulfuric acid.

By using a finely-dispersed carbon black slurry to prepare the silica coated carbon black, the tendency of the silica particle to self-agglomerate in the solution is minimized. Additionally, the silica-coated carbon black will have improved consistency due to the fine stable dispersion of the treated carbon black.

With regard to the attachment of the organic group onto the carbon black, any amount of organic groups can be attached onto the carbon black. For example, from about 0.01 to about 15.0 $\mu$mol of organic group can be attached per $m^2$ of carbon black. It is preferred that the organic group is attached in an amount of from about 0.01 to about 0.75 mmol/g of carbon black and more preferably from about 0.01 to about 0.30 mmol/g of carbon black.

With respect to the amount of silica coated onto the carbon black having an attached organic group, while any amount can be coated onto the carbon black having an attached organic group, it is preferred that the carbon black having an attached organic group is entirely coated with silica. Preferably, the carbon black having an attached organic group is coated with at least 10 wt % of silica and more preferably at least 15 wt % of silica.

Elastomeric compounds having desirable hysteresis and other properties may be obtained by compounding an elastomer with the silica coated carbon blacks prepared as described above.

Elastomeric compounds incorporating a silica coated carbon black as disclosed above may be additionally compounded with one or more coupling agents to further enhance the properties of the elastomeric compound. Coupling agents, as used herein, include, but are not limited to, compounds that are capable of coupling fillers such as carbon black or silica to an elastomer. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG), g-mercaptopropyltrimethoxy silane (A189, from Union Carbide Corp., Danbury, Conn.); zirconate coupling agents, such as zirconium dineoalkanolatodi(3-mercapto) propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S, a mixture of Si-69 and N330 carbon black, available from Degussa AG.

Rather than compounding the elastomeric compounds incorporating silica coated carbon blacks with the coupling agent, the silica coated carbon blacks of the present invention may be oxidized and/or combined with a coupling agent prior to compounding. Suitable oxidizing agents include, but are not limited to, nitric acid and similar compounds. Coupling agents include, but are not limited to, any of the coupling agents set forth above. The pre-coupled silica coated carbon blacks may then be incorporated into the elastomeric compounds as otherwise disclosed herein.

One process for attaching an organic group to the carbon black involves the reaction of at least one diazonium salt with a carbon black in the absence of an externally applied current sufficient to reduce the diazonium salt. That is, the reaction between the diazonium salt and the carbon black proceeds without an external source of electrons sufficient to reduce the diazonium salt. Mixtures of different diazonium salts may be used. This process can be carried out under a variety of reaction conditions and in any type of reaction medium, including both protic and aprotic solvent systems or slurries.

In another process, at least one diazonium salt reacts with a carbon black in a protic reaction medium. Mixtures of different diazonium salts may be used. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below.

The processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

The diazonium salt may be prepared prior to reaction with the carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, s which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbon black. Thus, the processes can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbon black in the reaction medium, for example, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon black limits the processes of the invention.

The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred.

In general, the processes produce inorganic by-products, such as salts. In some end uses, such as those discussed below, these by-products may be undesirable. Several possible ways to produce a carbon black product without unwanted inorganic by-products or salts are as follows:

First, the diazonium salt can be purified before use by removing the unwanted lo inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art, and include washing or removal of ions by reverse osmosis.

The reaction between a diazonium salt and a carbon black forms a carbon black having an organic group attached to the carbon black. The diazonium salt may contain the organic group to be attached to the carbon black. It may be possible to produce the carbon black products by other means known to those skilled in the art.

The organic group may be an aliphatic group, a cyclic organic group, or an organic compound having an aliphatic portion and a cyclic portion. As discussed above, the diazonium salt employed can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hindrance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, $COO^-NR_4^+$, halogen, CN, $NR_2$, $SO_3H$, sulfonate salts such as $SO_3Li$, $SO_3Na$ (i.e., the organic group may be p-$C_6H_4SO_3Na$), $SO_3K$, $SO_3^-NR_4^+$, $OSO_3H$, $OSO_3^-$ salts, NR(COR), $CONR_2$, $NO_2$, $PO_3H_2$, phosphonate salts such as $PO_3HNa$ and $PO_3Na_2$, phosphate salts such as $OPO_3HNa$ and $OPO_3Na_2$, N=NR, $NR_3^+X^-$, $PR_3^+X^-$, $S_kR$, $SSO_3H$, $SSO_3^-$ salts, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, and $SO_2R$. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion $X^-$ is a halide or an amine derived from a mineral or organic acid. Q is $(CH_2)_w$, $(CH_2)_xO(CH_2)_2$, $(CH_2)_xNR$ $(CH_2)$, or $(CH_2)_xS(CH_2)_z$, where w is an integer from 2 to 6 and x and z are integers from 1 to 6.

A preferred organic group is an aromatic group of the formula $A_yAr$—, which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$— $C_6H_4$—$NH_2$, $CH_2$—$C_6H_4$-$NH_2$, and $C_6H_5$.

Another preferred set of organic groups which may be attached to a carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black.

The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; a substituted or unsubstituted carboxyphenyl; a substituted or unsubstituted sulfonaphthyl group or a salt thereof; or a substituted or unsubstituted (polysulfo) naphthyl group or a salt thereof. Such groups include, for example, $C_6H_4SO_3^-M^+$, $C_6H_4CO_2^-M^+$, wherein M+ is Na+, K+, or Li+. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), 2-sulfoethyl (2-aminoethanesulfonic acid). Other organic groups having ionizable functional groups forming anions may also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups (-NR3+) and quaternary phosphonium groups ($—PR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersibility relative to the corresponding untreated carbon black. Water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferable that the ionic strength of the aqueous medium be less than 0.1 molar. More preferably, the ionic strength is less than 0.01 molar.

When such a water dispersible carbon black product is prepared, it is preferred that the ionic or ionizable groups be ionized in the reaction medium. The resulting product solution or slurry may be used as is or diluted prior to use. Alternatively, the carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, carbon black having an organic group substituted with an ionic or an ionizable group may be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A-(CH_2)_qS_K(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred carbon blacks are those having an attached aromatic sulfide organic group of the formula —$(C_6H_4)$—$S_k$—$(C_6H_4)$—, where k is an integer from 1 to 8, and more preferably where k ranges from 2 to 4. Particularly preferred aromatic sulfide groups are bis-para-$(C_6H4)$—$S_2$—$(C_6H_4)$— and para-$(C_6H_4)$—$S_2$—$(C_6H_5)$. The diazonium salts of these aromatic sulfide groups may be conveniently prepared from their corresponding primary amines, $H_2N-Ar-S_k-Ar'-NH_2$ or $H_2N-Ar-Sk-Ar''$. Preferred groups include dithiodi-4,1-phenylene, tetrathiodi-4,1-phenylene, phenyldithiophenylene, dithiodi-4,1-(3-chlorophenylene), —(4-$C_6H_4$)-S-S-(2-$C_7H4NS$), —(4-$C_6H_4$)-S-S-(4-$C_6H_4$)—OH, -6-(2-$C_7H_3NS$)—SH, —(4-$C_6H_4$)—$CH_2CH_2$-S-S-$CH_2CH_2$-(4-$C_6H_4$)—, —(4-$C_6H_4$)—$CH_2CH_2$-S-S-S-$CH_2CH_2$-(4-$C_6H_4$)—, —(2-$C_6H_4$)-S-S-(2-$C_6H_4$)—, —(3-$C_6H_4$)-S-S-(3-$C_6H_4$)—, -6-($C_6H_3N_2S$), -6-(2-$CH_3NS$)-S-NRR' where RR' is —$CH_2CH_2OCH_2CH_2$—, —(4-$C_6H_4$)-S-S-S-S-(4-$C_6H_4$)—, —(4-$C_6H_4$)—CH=$CH_2$, —(4-$C_6H_4$)-S-$SO_3H$, —(4-$C_6H_4$)—$SO_2NH$—(4-$C_6H_4$)-S-S-(4-$C_6H_4$)-$NHSO_2$-(4-$C_6H_4$)—, —6-(2-$C_7H_3NS$)-S-S-2-(6-$C_7H_3NS$)—, —(4-$C_6H_4$)-S-$CH_2$-(4-$C_6H_4$)—, —(4-$C_6H_4$)—$SO_2$-S-(4-$C_6H_4$)—, —(4-$C_6H_4$)-$CH_2$-S-$CH_2$-(4-$C_6H_4$)—, —(3-$C_6H_4$)-$CH_2$-S-$CH_2$-(3-$C_6H_4$)—, —(4-$C_6H_4$)-$CH_2$-S-S-$CH_2$-(4-$C_6H_4$)—, —(3-$C_6H_4$)-$CH_2$-S-S-$CH_2$-(3-$C_6H_4$)—, —(4-$C_6H_4$)-S-NRR' where RR' is —$CH_2CH_2OCH_2CH_2$—, —(4-$C_6H_4$)-$SO_2NH$-$CH_2CH_2$-S-S-$CH_2CH_2$-$NHSO_2$-(4-$C_6H_4$)—, —(4-$C_6H_4$)-2-(1,3-dithianyl), and —(4-$C_6H_4$)-S-(1,4-piperizinediyl)-S-(4-$C_6H_4$)—.

Another preferred set of organic groups which may be attached to the carbon black are organic groups having an aminophenyl, such as ($C_6H_4$)-$NH_2$, ($C_6H_4$)-$CH_2$-($C_6H_4$)-$NH_2$, ($C_6H_4$)-$SO_2$-($C_6H_4$)-$NH_2$. Preferred organic groups also include aromatic sulfides, represented by the formulas Ar-$S_n$-Ar' or Ar-$S_n$-Ar", wherein Ar and Ar' are independently arylene groups, Ar" is an aryl, and n is 1 to 8. Methods for attaching such organic groups to carbon black are discussed in U.S. patent applications Ser. Nos. 08/356,660, and 08/572,525, and U.S. Pat. No. 5,559,169, and PCT application No. WO 96/18688, the disclosures of which are fully incorporated by reference herein.

In addition, a mixture of silica coated carbon black and a modified carbon black having at least one attached organic group may be used. Furthermore, it is within the bounds of this application to also use a mixture of silica and silica coated carbon black. Also, any combination of additional components with the silica coated carbon black may be used, such as one of the following:

a) silica coated carbon black with an attached organic group optionally treated with silane coupling agents;
b) modified carbon black having an attached organic group;
c) silica;
d) modified silica, for example, having an attached organic group;
e) carbon black; and/or
f) an aggregate having a carbon phase and a silicon-containing species phase and/or metal-containing species phase.

Examples of silica include, but are not limited to, silica, precipitated silica, amorphous silica, vitreous silica, fumed silica, fused silica, silicates (e.g., aluminosilicates), and other Si-containing fillers such as clay, talc, wollastonite, and the like. Silicas are commercially available from such sources as Cabot Corporation under the Cab-O-Sil® tradename, PPG industries under the Hi-Sil and Ceptane tradenames, Rhone-Poulence under the Zeosil tradename; and Degussa AG under the Ultrasil and Coupsil tradenames.

The elastomeric compounds of the present invention may be prepared from the silica coated carbon blacks by compounding with any elastomer including those useful for compounding a carbon black.

Any suitable elastomer may be compounded with the silica coated carbon blacks to provide the elastomeric compounds of the present invention. Such elastomers include, but are not limited to, rubbers, homo- or co-polymers of 1,3-butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about −120° C. to about 0° C. Examples include, but are not limited, styrene-butadiene rubber (SBR), natural rubber, polybutadiene, polyisoprene, and their oil-extended derivatives. SBRs include, but are not limited to, solution SBR, functional solution SBR, emulsion SBR, and combinations of any of the foregoing. Blends of any of the foregoing elastomers may also be used.

Among the rubbers suitable for use with the present invention are natural rubber and its derivatives such as chlorinated rubber. The silica coated carbon black products of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids, and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrenebutadiene), and poly(isoprene).

Elastomeric compositions also include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

In making the elastomeric compositions, one or more curing agents such as, for example, sulfur, sulfur donors, activators, accelerators, peroxides, and other systems used to effect vulcanization of the elastomer composition may be used.

The elastomeric compositions of the present invention may contain an elastomer, curing agents, reinforcing filler, a coupling agent, and, optionally, various processing aids, oil extenders, and antidegradents.

Formulation of the silica coated carbon blacks of the present invention with elastomers are contemplated to have advantages not realized when such elastomers are formulated with conventional carbon blacks. In addition to EPDM and peroxide cured elastomers, advantages for this silica coated carbon black would also be expected in elastomers containing elements other than carbon and hydrogen. Examples of elastomers containing non-hydrogen groups would include but not be limited to NBR (acrylonitrile-butadiene rubber), XNBR (carboxylic-acrylonitrile-butadiene rubber), HNBR (hydrogenated-acrylonitrile-butadiene rubber), CR (chloroprene rubber), ECO (ethylene oxide-chloromethyl oxirane), GPO (polypropylene oxide-allyl glycidyl ether), PPO (polypropylene oxide), CSM (chloro-sulfonyl-polyethylene), CM (chloro-polyethylene), BIIR (bromo-isobutene-isoprene rubber), CIIR (chloro-isobutene-isoprene rubber), ACM (copolymers of ethyl or other acrylate and small amount of vulcanizable co-monomer), and AEM (copolymers of ethyl or other acrylate and ethylene).

The resultant elastomeric compounds containing silica coated carbon black and optionally containing one or more coupling agents may be used for various elastomeric products such as treads for vehicle tires, industrial rubber products, seals, timing belts, power transmission belting, and other rubber goods. When utilized in tires, the elastomeric compounds may be used in the tread or in other components of the tire, for example, the carcass and sidewall.

The present invention will be further clarified by the following examples, which are intended to be purely exemplary of the invention.

EXAMPLE 1

The reinforcing agents were coated with silica as follows:

Grounded N234 carbon black or grounded sulfanilic acid treated N234 carbon black was mixed with water to make a 5 wt % slurry. The slurry was then heated to 80–90° C. and the pH adjusted to 10–10.5 by using NaOH. A 2.5% $H_2SO_4$ solution and a sodium silicate solution diluted to an equivalent of 5% $SiO_2$ was simultaneously added while maintaining constant pH and temperature. The sodium silicate solution was added at the rate of 3 wt % of the carbon black per hour. After completion of addition, stirring was continued for 1 hour. The sulfuric acid was then used to adjust the pH to 6.5–7. The slurry was then filtered and washed with water 5 times and dried at 120° C. overnight. In this manner the carbon black and treated carbon black were coated with 15 wt % of silica.

The sulfanilic acid treated N234 carbon black was made by dissolving 6.92 gms of sulfanilic acid in 2000 ml of water at 70° C. After all of the sulfanilic acid was dissolved, 400 gms of N234 carbon black were added. The slurry was stirred for 2 minutes, then 3.036 gms of $NaNO_2$ were added in 100 ml of water. The slurry was stirred at 70° C. for 4 hours, and then cooled to room temperature. The N234 carbon black, as a result, had attached p-sulfophenyl groups on its surface.

When the untreated N234 carbon black was to be coated with silica, the carbon black was required to be ground in a 1.25 gallon porcelain ball mill for 3 days using a solution of 13% N234 carbon black, 85% water and 2% methanol. The ball mill was manufactured by Paul O. Abby, Little Falls, N.J. In contrast, when the N234 was first treated with sulfanilic acid, the treated carbon black to be coated with silica, easily dispersed in the coating solution within 30 seconds using a Waring Commercial Blender, Model 30BL97, available through VWR Scientific in Boston, Mass.

EXAMPLE 2

Elastomeric compounds were prepared according to the following formulation:

|  | Parts per hundred rubbers |
| --- | --- |
| Duradene 715 | 75 |
| Tacktene 1203 | 25 |
| Reinforcing Agent | 80 |
| Si-69 | 2.5 or 5.0 |
| Sundex 8125 | 32.5 |
| Zinc Oxide | 3.5 |
| Stearic Acid | 2 |
| Flexzone 7P | 1.5 |
| Sunproof Improved | 1.5 |
| Durax | 1.5 |
| Vanax | 0.5 |
| Benzyl Tuex | 0.25 |
| Sulfur | 1.4 |

Duradene 715 is a solution SBR obtained from Firestone Synthetic Rubber and Latex Co., Akron, Ohio. Tacktene 1203 is polybutadiene rubber obtained from Bayer Corporation, Akron, Ohio. Si-69 is bi-triethexy silyl propyl tetra sulfane manufactured by Degussa A. G., Germany. Sundex 81254 is an aromatic oil from Sun Refining. Zinc Oxide was obtained from Zinc Inc., New Jersey. Stearic acid was obtained from Emery Chemicals, Cincinnati, Ohio. Flexzone 7P,N-(1,3.-dimethyl butyl)-$N^6$-phenyl-p-phenylene diamine, is an anti-oxidant available from Uniroyal Chemical Co., Middlebury, Conn. Vanax is diphenylguanidine, obtained from Akrochem Corporation, Akron, Ohio. Sunproof improved is a wax, also from Uniroyal Chemical Co. Benzyl Tuex (Tetramethyl thiuram disulfide) is an accelerator also from Uniroyal Chemical Co. Durax, N-cyclohexane-2-benzothiazole sulphenamide, is an accelerator available from R. T. Vanderbilt Co., Norwalk, Conn. Sulfur was obtained from R. E. Carroll, Trenton, N.J.

The compounds were prepared using a 3-stage mixing procedure. The internal mixer used was a plasti-coder EPL-V (obtained from C. W. Brabender, South Hackensack, N.J.) equipped with a cam type mixing head (capacity 600 ml).

In the first stage, the mixer was set at 80° C. and the rotor speed was set at 60 rpm. After the mixer was conditioned to 100° C. by heating the chamber with a dummy mixture, the elastomer was loaded and masticated for one minute. The reinforcing agent, pre-blended with coupling agent, was then added. When the temperature reached 160° C., the batch was dumped. The batch was then passed through an open-mill (4 inch, 2 roll mill, obtained from C. W. Brabender) three times and stored at room temperature for two hours.

In the second stage, the mixer was similarly conditioned to 100° C. The batch was then put into the mixer. At 1 minute, zinc oxide and stearic acid were added. At 3 minutes, Flexzone 7P and Sunproof Improved were added. At 4 minutes, the batch was dumped and passed through the 2 roll mill as before. It was then stored at room temperature for 2 hours.

In stage 3, the mixer was similarly conditioned except the rpm was set at 35. The batch was then entered into the mixer. At 1 minute, the Durax, Benzyl Tuex and Sulfur were added. After 2 minutes, the batch was dumped. It was then similarly passed through the 2 roll mill.

EXAMPLE 3

The treated carbon blacks were then compounded using the tire tread formulation in Example 2. The results are as follows:

| Reinforcing Agent | Si69 phr | Treatment with Sulfanilic Acid, mmole/gm | tanδ 0° C./70° C. | Abrasion 14%/21% | |
| --- | --- | --- | --- | --- | --- |
| 15 wt % silica | 2.5 | 0.7 | 0.45/0.26 | 100 | 100 |
|  | 2.5 | 0.1 | 0.43/0.24 | 97 | 112 |
|  | 2.5 | 0.4 | 0.39/0.25 | 95 | 62 |
|  | 5 | 0.0 | 0.43/0.23 | 100 | 100 |
|  | 5 | 0.1 | 0.42/0.25 | 96 | 103 |
|  | 5 | 0.4 | 0.39/0.23 | 91 | 95 |

The data shows that treating the carbon black with sulfanilic acid leaves the properties of the silica coated carbon black substantially unchanged, but allows improved dispersion of the carbon black for coating with silica.

Abrasion resistance was determined using an abrader, which is based on a mbourn-type machine as described in U.S. Pat. No. 4,995,197, hereby incorporated by reference. The tests were carried out at 14% and 21% slip. The percentage slip was determined based on the relative velocities of a sample wheel and a grindstone wheel. The abrasion resistance index was calculated from the mass loss of the elastomeric compound. Dynamic properties were determined using a Rheometrics Dynamic Spectrometer II (RDS II, Rheometrics, Inc., N.J.) with strain sweep. The measurements were made at 0 and 70° C. with strain sweeps over a range of double strain amplitude (DSA) from 0.2 to 120%. The maximum tan δ values on the strain sweep curves were taken from comparing the hysteresis among elastomeric compounds. Alternatively, hysteresis measurements were made by means of temperature sweeps at a DSA of 5% and a frequency of 10 Hz.

All patents, applications, test methods, and publications mentioned herein are incorporated by reference.

The present invention has of necessity been discussed herein by reference to certain specific methods and materials. The enumeration of these methods and materials was merely illustrative, and in no way constitutes any limitation on the scope of the present invention. It is to be expected that those skilled in the art may discern and practice variations of or alternatives to the specific teachings provided herein, without departing from the scope of the present invention. For example, the compositions of the present invention may include other reinforcing agents, other fillers, oil extenders, antidegradants, and the like.

What is claimed is:

1. A process for making a silica coated carbon black comprising the steps of:
    a) homogenizing a carbon black dispersion having carbon black agglomerates to form carbon black wherein at least 90% of carbon black agglomerates are less than 10 microns in size, and
    b) coating the carbon black with silica.

2. A process for making a silica coated carbon black comprising the steps of:
    a) preparing a fine dispersion of carbon black, and;
    b) coating the carbon black with silica, wherein said fine dispersion of carbon black is prepared by attaching an organic group onto the carbon black.

3. A process for making a silica-coated carbon black comprising mixing carbon black having an attached organic group with an organic silicon compound.

4. The process of claim 3, further comprising adding an ammonia solution.

5. The process of claim 3, wherein said carbon black having an attached organic group is present as an aqueous slurry.

6. The process of claim 3, wherein said silicon compound is diluted in a solvent.

7. The process of claim 3, wherein said silicon compound is added incrementally.

8. The method of claim 4, wherein said carbon black having an attached organic group is added to the ammonia solution.

9. The process of claim 4, wherein said ammonia solution is added to the carbon black having an attached organic group.

10. The process of claim 3, wherein said attached organic group is p-sulfophenyl.

11. A process for making a silica-coated carbon black comprising mixing carbon black having an attached organic group with an inorganic silicon compound solution.

12. The process of claim 11, further comprising adding an acid solution.

13. The process of claim 12, wherein said acid solution is a $H_2SO_4$ solution.

14. The process of claim 11, wherein said inorganic silicon compound solution is a sodium silicate solution.

15. The process of claim 14, wherein said sodium silicate solution is diluted to an equivalent of about 5% $SiO_2$.

16. A process of preparing a silica-coated carbon black comprising coating a carbon black having an attached organic group with silica.

17. The process of claim 16, wherein said attached organic group is p-sulfophenyl.

18. The process of claim 16, wherein said carbon black having an attached organic group is prepared by reacting carbon black with a diazonium salt.

19. The process of claim 18, wherein said diazonium salt is a diazonium salt of sulfanilic acid.

20. The process of claim 16, wherein carbon black having an attached organic group is present as an aqueous slurry.

21. The process of claim 16, wherein said organic group is present in an amount of from about 0.01 to about 15.0 $\mu mol/m^2$ of carbon black.

22. The process of claim 16, wherein said organic group is present in an amount of from about 0.01 to about 0.75 mmol/g of carbon black.

23. The process of claim 22, wherein said organic group is present in an amount of from about 0.01 to about 0.30 mmol/g of carbon black.

24. The process of claim 17, wherein said attached p-sulfophenyl groups are attached in an amount of from about 0.01 to about 0.30 mmol/g of carbon black.

25. The silica coated carbon black produced according to the process as defined by claim 1.

26. A composition comprising the silica coated carbon black as defined by claim 25.

27. An article of manufacture comprising the silica coated carbon black as defined by claim 25.

28. The article of manufacture as defined by claim 27, wherein said article of manufacture comprises an elastomeric composition.

* * * * *